United States Patent [19]

Curasi et al.

[11] Patent Number: 5,257,144

[45] Date of Patent: Oct. 26, 1993

[54] SYNCHRONIZATION AND AUTOMATIC RESYNCHRONIZATION OF MULTIPLE INCREMENTAL RECORDERS

[75] Inventors: Joseph B. Curasi, Melbourne Beach; Frank D. Wright, Palm Bay, both of Fla.

[73] Assignee: Grumman Aerospace Corporation, Bethpage, N.Y.

[21] Appl. No.: 846,875

[22] Filed: Mar. 6, 1992

[51] Int. Cl.[5] ............................................. G11B 5/09
[52] U.S. Cl. ........................................ 360/51; 371/1
[58] Field of Search ................. 360/51, 69, 46; 371/1

[56] References Cited

U.S. PATENT DOCUMENTS 4,833,695  5/1989  Greub ..................................... 371/1
4,868,922  9/1989  Tsuji et al. ........................... 360/51

Primary Examiner—Thomas E. Denion
Attorney, Agent, or Firm—Bacon & Thomas

[57] ABSTRACT

A system capable of synchronizing and automatically resynchronizing multiple DCRSi units includes a monitor for monitoring respective channels output by each unit for frame sync words which have been simultaneously inserted into each unit during recording. If the frame sync words are not present simultaneously, the sequence and magnitude of the offset is determined and synchronization of the data output is adjusted by adding additional reads to the channels that slip behind.

12 Claims, 2 Drawing Sheets

SYNCHRONIZATION AND AUTOMATIC RESYNCHRONIZATION OF MULTIPLE INCREMENTAL RECORDERS

The United States Government has rights in this invention pursuant to U.S. Contract No. F19628-85-COO53 awarded by the Defense Logistics Agency of the Department of Defense.

BACKGROUND OF THE INVENTION

1. Field of the Invention

This invention relates to the field of dynamic information storage and retrieval, and in particular to a method and apparatus for synchronizing and resynchronizing multiple incremental digital cassette recorder (DCRSi) units.

2. Description of Related Art

Incremental recorders are information storage devices which buffer the variable user data rate from the internal fixed high-speed-read-write rate of the recorder. An example of an incremental recorder is the digital magnetic recording tape cassette (DCRSi) unit sold by Ampex Corporation.

Synchronization of multiple DCRSi units, or other incremental recording units, permits the user to achieve a high bit rate recording device that appears to the system as a single device. Data received from the host system is disassembled by the synchronization controller and buffered by the individual recorder units for simultanous recording. Retrieved data is reassembled and sent to the host system in its original format. Such synchronization results in recording capabilities beyond what is available for a single machine.

A disadvantage with using multiple DCRSi and other recording units is that, when one or more of the units loses synchronization during playback, operator intervention is required to attain resynchronization of the recorders. At present, no system is known for achieving synchronization and automatic resynchronization of multiple DCRSi or other incremental recording units.

SUMMARY OF THE INVENTION

It is therefore an objective of the invention to provide a system capable of synchronization and automatic resynchronization of multiple DCRSi units.

This objective is achieved by injecting a frame sync word at periodic intervals simultaneously into each unit during recording, and monitoring retrieved data for the frame sync words during playback. If synchronization is lost, each unit is automatically adjusted to achieve resynchronization.

A frame sync decoder is provided for each recording unit in order to monitor the data stream for the occurrence of the frame sync word in each of the DCRSi channels, after which a frame sync detect sequencer inputs the decoded frame sync words and outputs individual frame sync gates for each of the DCRSi channels to a synchronization monitor.

The synchronization monitor monitors the occurrence of the frame sync gates on each operating channel and adjusts the synchronization of the data if out of alignment. The adjustment is made by controlling the DCRSi units to add additional reads to the channels that slip behind. Resynchronization of the input data is therefore automatic upon the loss of frame sync.

DETAILED DESCRIPTION OF THE PREFERRED EMBODIMENTS

Figure 1:
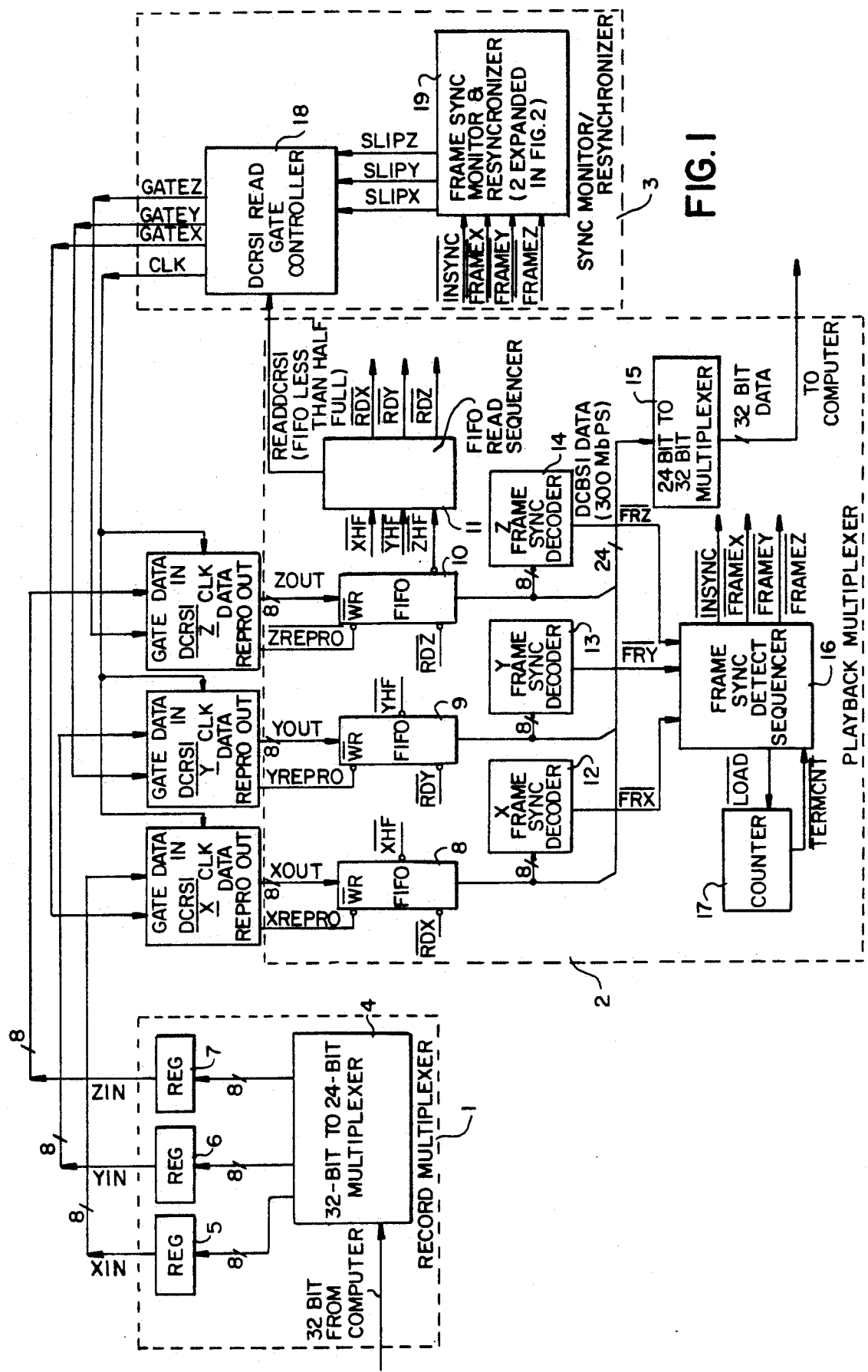
FIG. 1 is a schematic circuit diagram of a multiple incremental digital cassette recorder synchronization and automatic resynchronization system constructed in accordance with the principles of a preferred embodiment of the invention.

The synchronization and automatic resynchronization system of the preferred embodiment is suitable for use with an incremental digital cassette recorder such as the AMPEX DCRSi recorder. The system shown in FIG. 1 includes three DCRSi unit input/output buffer control circuits DCRSi X, DCRSi Y, and DCRSi Z, a record multiplexer 1, a playback multiplexer 2, and synchronization monitor/resynchronizer 3. The input/output circuits represent those typically found on AMPEX type DCRSi units. However, it will be appreciated by those skilled in the art that the synchronization and resynchronization techniques of the preferred embodiment are applicable to recording systems other than the illustrated system.

For example, incremental recording devices other than digital magnetic tape cassette recorders may easily be adapted for use with the preferred system. Also, the preferred synchronization/resynchronization system is adaptable for use with systems containing more or less than three recorder units. For those systems which are not incremental, a large enough input data rate buffer must be designed to isolate the output data from the recorder electronics during start/stop operation, but such systems are nevertheless intended to be included within the scope of the invention because the design of such a buffer is well within the capability of one skilled in the art.

In the illustrated embodiment, data to be recorded is received in 32-bit format from a host system computer by record multiplexer 1, which multiplexes 32-bit data received from the computer to 24-bits. The 24-bit data, in the form of eight bit signals XIN, YIN, and ZIN, is output from multiplexer chip 4 via registers 5-7 to respective DATA IN terminals of the three eight bit input/output circuits DCRSi X, DCRSi Y, and DCRSi Z. The data is output in the exemplary embodiment at 13 MHz with a 96.2% duty cycle (100 Mbps), although the data format and rate may be varied within the scope of the invention, depending on both the host system's and the recording system's input/output configurations.

Input of the data from registers 5-7 is synchronized by clock signals generated by sync monitor/resynchronizer 3, described in detail below, and input to the DATA IN terminals of the DCRSi input/output circuits. The frame sync words are inserted into the output of multiplexer chip 4 at periodic intervals and recorded by the DCRSi units. In the exemplary system, the frame sync word contains three bytes, although any suitable frame sync word format may be used. However, the interval between frame sync word insertions should be at least half the depth of the playback multiplexer's FIFO memories, as will become apparent from the following description.

Playback multiplexer 2 includes three First-In-First-Out memories (FIFOs) 8-10, one for each recorder.

FIFOs 8-10 correct for skew between the reproduce clocks (REPRO) of the respective recorder input/output circuits DCRSI X, Y, and Z. Data XOUT, YOUT, and ZOUT is written into each FIFO in response to signals XREPRO, YREPRO, and ZREPRO from a reproduce clock of the associated recorder. When a FIFO is half full, a signal XHF, YHF, or ZHF is sent from an HF terminal of a respective FIFO to the sequencer 11, which generates signals RDX, RDY, and RDZ at fixed, predetermined intervals, thus ensuring that the reads are in sync so long as the data output by the DCRSi units does not get ahead or behind by more than one half of a respective FIFO. Data is therefore read from the FIFOs under the control of FIFO read sequencer 11 which outputs the data to a 24-bit to 32-bit multiplexer 15 at a rate of 300 Mbps. The 24-bit to 32-bit multiplexer 15 in turn outputs 32-bit data to the host system computer.

The data output by FIFOs 8-10 under the control of sequencer 11 is also read by a plurality of frame sync decoders 12-14, one for each recorder. Decoders 12-14 monitor the data output by the FIFOs for the occurrence of the frame sync word in each of the recorder channels. The frame sync detect sequencer 16 inputs decoded frame sync words FRX, FRY, and FRZ from decoders 12-14 and outputs individual frame sync gates FRAMEX, FRAMEY, and FRAMEZ for each of the channels to the synchronization monitor 3. In addition, sequencer 16 generates an in-synchronization signal (INSYNC) which is asserted once the frame syncs have occurred for two or more consecutive intervals, as counted by counter 17. Counter 17 outputs a terminal count signal, TERMCNT, each time the frame sync word insertion interval has been reached.

Synchronization monitor 3 monitors the occurrence of frame sync gates FRAMEX, FRAMEY, and FRAMEZ on each operating channel and adjusts the synchronization of the data if the frame sync in the channels is out of alignment. Adjustment is made by adding additional reads to the channels that slip behind. Resynchronization of the input data is automatic upon the loss of frame sync.

Figure 2:
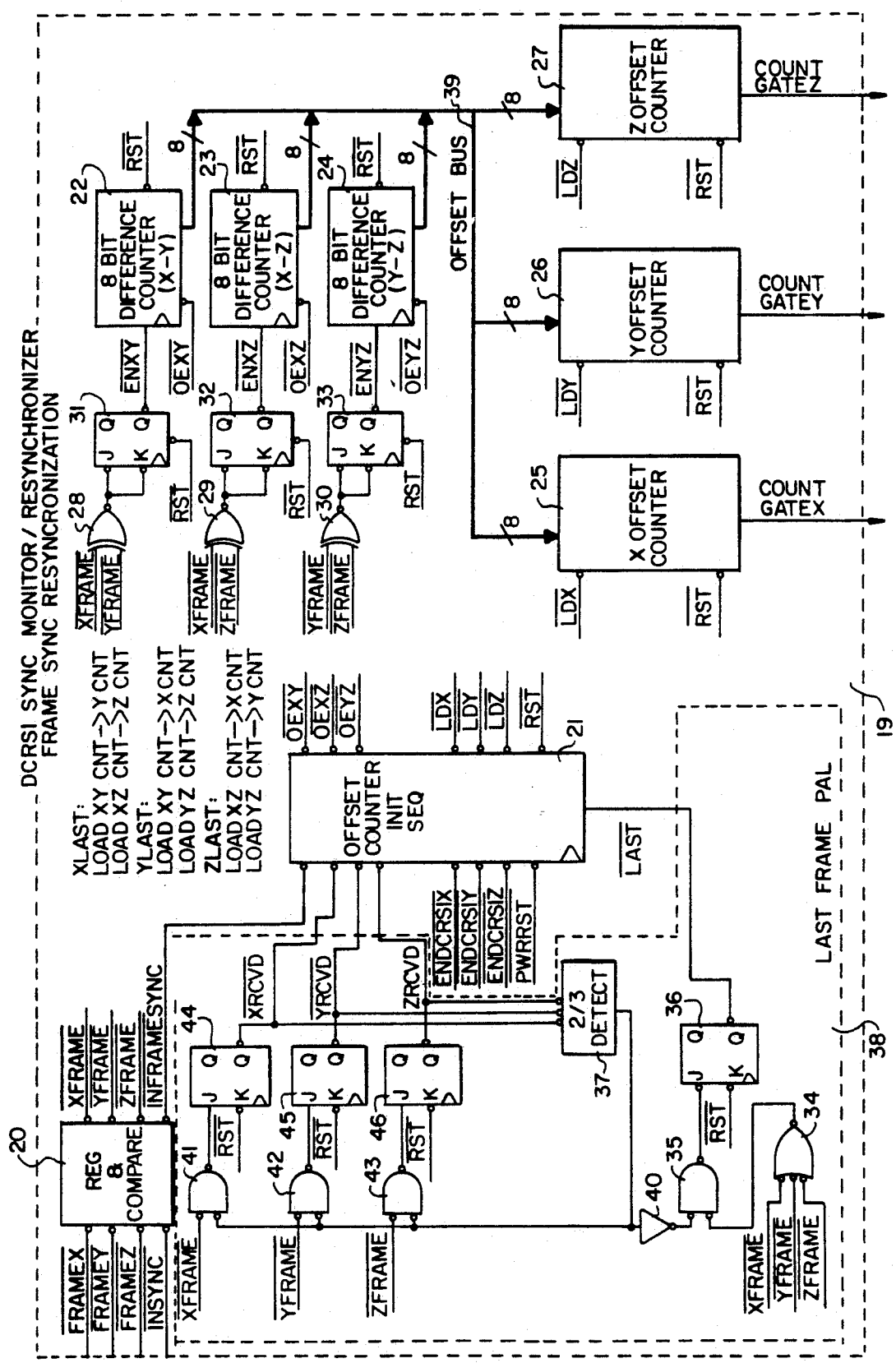
FIG. 2 is a schematic circuit diagram showing in detail a portion of the sync monitor/resynchronizer illustrated in FIG. 1.

A block diagram of the synchronization monitor/resynchronizer circuit 19 which accomplishes the automatic adjustment is shown in FIG. 2. A READDCRSI gate output by playback multiplexer read sequencer 11 is input to read gate controller 18 (FIG. 1) to request data to be read simultaneously when sequencer 11 receives half full signals XHF, YHF, and ZHF, unasserted (not half full) from each of respective FIFOs 8-10. DCRSi read gate controller 18 inputs the READDCRSI gate, and in response outputs data ready gates GATEX, GATEY, and GATEZ and clock signal CLK to each recorder unit input/output control circuit.

The frame sync monitor and resynchronizer circuit 19 includes an input register which generates a signal INFRAMESYNC in response to receipt of the three frame sync gates FRAMEX, FRAMEY, and FRAMEZ and signal INSYNC. Offset sequencer 21 is activated by the loss of the in sync signal INSYNC, which causes the INFRAMESYNC signal to be disabled. Offset sequencer 21 includes three input terminals for frame sync gate received signals XRCVD, YRCVD and ZRCVD, only two of three are present at the terminal depending on the last frame to be received, as determined by the last frame programmable array logic (PAL) circuit 38, described in more detail below. Offset sequencer 21 also includes channel enabling terminals ENDCRSiX, ENDCRSiY, and ENDCRSiZ, and power reset terminal PWRRST. The output of offset sequencer 21 includes output enable signals OEXY, OEXZ, and OEYZ, which enable the output of 8-bit difference counters 22-24, and counter load signals LDX, LDY, and LDZ, which cause offset counters 25-27 to load differences between the respective frame sync words for each channel via offset bus 39.

Difference counters 22-24 operate by incrementing a sum based on the presence of enable signals ENXY, ENXZ, and ENYZ, which are generated in response to differences between the respective XFRAME, YFRAME, and ZFRAME signals. Exclusive NOR gates 28-30 cause counters 22-24 to input and count a difference signal whenever only one of the two respective frame sync signals XFRAME, YFRAME, or ZFRAME are present at an input, indicating a lack of synchronization. Each time there is a difference, flip-flops 31-33 output a signal ENXY, ENXZ, and ENYZ to a respective difference counter 22-24 which measures the extent of difference between decoded sync words in the respective channels. Each of the difference counter values are individually transferred to offset counters 25-27 by enabling the difference counter output OEXY, OEXZ, OEYZ and the destination counter load LDX, LDY, LDZ for each of the values to be transferred.

Count gates COUNTGATEX, COUNTGATEY, and COUNTEGATEZ, which are proportional to the number of read gate clock signals which are to be inhibited, thereby causing additional reads to be added to the data output, are then output by the offset counters 25-27 and input by read gate controller 18 as difference signals SLIPX, SLIPY, and SLIPZ, in response to which read gate controller modifies the data output from input/output circuits DCRSiX, DCRSiY, and DCRSiZ by inserting reads until resynchronization for two consecutive frames is detected by counter 17 and sequencer 16.

Sync monitor 3 therefore operates as follows: Initially, last frame PAL circuit 38 determines the recorder unit or channel whose frame sync signal has arrived last. Offset sequencer 21 loads the offset counters 25-27 with values from the difference counters 22-24 based upon the last frame sync signal received. Only those channels requiring a correction factor are loaded as a result of X-NOR circuits 28-30. The offset counters then output count gates proportional to the number of clock periods that are to be inhibited. The count gates are output as ready gates to the recorder units to achieve resynchronization.

Last frame PAL circuit 38 includes a logic gate 34 with outputs a signal when either of three sync signals are present. A LAST signal is output by J-K flip-flop 36 to the offset sequencer, which reads which frame is present at inputs XRCVD, YRCVD, and ZRCVD, thus determining the last frame, whenever logic gate 35 indicates that two out of the three sync signals have arrived based on the output from ⅔ detector 37 and the last frame sync has arrived. Those skilled in the art will of course recognize that any of the specific logic gates shown may be replaced by combinations of other logic gates to accomplish the same results.

When the INFRAMESYNC signal is present at the input to the offset sequencer 21, the offset sequencer outputs a reset signal RST which resets all flip-flops and counters in the sync monitor. The XFRAME, YFRAME, and ZFRAME signals are only allowed to pass through to the j-input of flip-flops 44-46 by logic gates 41-43 until two of the three signals have been detected by ⅔ detector 37, thus enabling detection of the last frame by offset sequencer 21, and consequent control of difference counters 22-24 to measure the difference to the last frame, thereby causing a count gate representative of the difference to be sent to the read gate controller to automatically cause the recorder units to resynchronize their data output.

Having thus described a specific embodiment of an incremental recorder synchronization and resynchronization system, it is nevertheless intended that the invention encompasses all variations of the embodiment specifically disclosed above which will occur to those skilled in the art. Included within the scope of the invention are, for example, variations in which the recorders are not specifically DCRSI recorders, and variations in which a number of recorders is not three. Further, it will be appreciated that the specific circuitry shown in FIGS. 1 and 2 may be modified in innumerable ways while still performing the same essential functions. Consequently, it is intended that the invention not be limited in any way by the above description, but rather that it be limited solely by the appended claims.

We claim:

1. A system for synchronizing and automatically resynchronizing multiple incremental data recording units, comprising:
   at least one input/output control circuit for each of a plurality of data recording units;
   data input means for transferring portions of a data stream to said data recording units, said portions of said data steam including simultaneously inserted frame sync words;
   read gate control means for causing one of said input/output control circuits to output said portions of said data including said simultaneously inserted frame sync words;
   frame sync decoder means connected to said input/output circuit for detecting said frame sync words;
   frame sync detect sequencer means connected to outputs of said frame sync decoder means for determining whether said frame sync words occur simultaneously in said data output by said input/output circuits;
   a sync monitor/resynchronizer including offset counter initiation sequencer means connected to an output of said frame sync detect sequencer means for receiving sequenced frame sync word gate signals from said frame sync detect sequencer means, difference counter means for determining a difference value based on an amount by which the frame sync word signals are offset, and offset counter means for controlling said read gate control means to vary said data output in response to said difference value.

2. A system as claimed in claim 1, wherein said data input means comprises record multiplexer means for receiving said data stream from a host system, multiplexing said data stream, and for distributing said portions of said data stream to said one of said input/output control circuits for each data recording unit.

3. A system as claimed in claim 2, wherein said multiplexer means comprises a 32-bit to 24-bit multiplexer, and three registers connected between said 32-bit to 24-bit multiplexer for outputting 8-bit data to each of three of said data recording units.

4. A system as claimed in claim 3, further comprising means including a 24-bit to 32-bit multiplexer for recombining data output by said three recording units, multiplexing said data output, and transferring said multiplexed data to said host system.

5. A system as claimed in claim 1, further comprising means including a plurality of First-In-First-Out memories connected between said input/output circuits and said frame sync decoder means for receiving data output by said input/output circuits.

6. A system as claimed in claim 5, further comprising read sequencer means for causing data to be output by said First-In-First-Out memories in response to signals generated by the read sequencer means, said read sequencer means further including means for instructing said read gate control means to cause said input/output circuits to output data in response to a fill status of said First-In-First-Out memories, subject to signals received by said read gate control means from said sync monitor/resynchronizer means.

7. A system as claimed in claim 1, wherein said frame sync detect sequencer means comprises means for generating an in sync signal upon detecting that said frame sync words are simultaneous for two consecutive intervals, and means for outputting said in sync signal to said offset counter initiation sequencer means of said frame sync monitor/resynchronizer means.

8. A system as claimed in claim 1, wherein said difference counter means comprises means for counting an interval between detection of the frame sync word gates and logic gates means for associating said difference with particular pairs of said data recording units.

9. A system as claimed in claim 8, wherein said logic gate means comprises a plurality of exclusive NOR gates and said means for counting an interval comprises a plurality of 8-bit difference counters, one for each different combination of two channels whose difference is to be determined.

10. A system as claimed in claim 1, wherein said offset counter means comprises a plurality of offset counters each including means for receiving difference values from said difference counter means when said offset counter initiation sequencer means fails to receive a frame sync signal from said frame sync detect sequencer means.

11. A system as claimed in claim 1, wherein said monitor further comprises a last frame detection circuit including means for determining which recording unit frame sync gate signal arrives last from said frame sync detect sequencer means, said last frame detection circuit being connected to cause one of said offset counters to generate a count gate based on said difference value.

12. A system as claimed in claim 11, wherein said last frame detection circuit comprises second logic gate means for receiving said frame sync word gate signals and a ⅔ detector for detecting when two of said frame sync word gate signals has arrived, said second logic gate including means for passing a third frame sync word gate signal to be received to said offset counter initiation sequence means in order to cause said difference counter means to determine said difference values.

* * * * *